US012694819B2

(12) United States Patent
Jeong et al.

(10) Patent No.: US 12,694,819 B2
(45) Date of Patent: Jul. 28, 2026

(54) DISPLAY DEVICE AND METHOD OF DRIVING THE SAME

(71) Applicant: SAMSUNG DISPLAY CO., LTD., Yongin-si (KR)

(72) Inventors: Se Min Jeong, Yongin-si (KR); Jin Sung Choi, Yongin-si (KR); Ju Bong An, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/750,044

(22) Filed: Jun. 21, 2024

(65) Prior Publication Data

US 2025/0174173 A1 May 29, 2025

(30) Foreign Application Priority Data

Nov. 27, 2023 (KR) ........................ 10-2023-0166859

(51) Int. Cl.
*G09G 3/20* (2006.01)

(52) U.S. Cl.
CPC ......... *G09G 3/2096* (2013.01); *G09G 3/2007* (2013.01); *G09G 2300/0819* (2013.01); *G09G 2300/0842* (2013.01); *G09G 2320/0233* (2013.01); *G09G 2360/16* (2013.01)

(58) Field of Classification Search
None
See application file for complete search history.

(56) References Cited

U.S. PATENT DOCUMENTS

| | | | | |
|---|---|---|---|---|
| 8,421,729 B2 | 4/2013 | Lee | | |
| 10,482,818 B2 | 11/2019 | Kwon et al. | | |
| 10,720,101 B2 | 7/2020 | Choi et al. | | |
| 11,514,832 B2 | 11/2022 | Kim et al. | | |
| 2007/0146510 A1* | 6/2007 | Lin | G09G 3/3611 | 348/E17.005 |
| 2013/0113787 A1* | 5/2013 | Shin | G09G 3/003 | 345/87 |
| 2013/0235006 A1* | 9/2013 | Shin | G09G 3/3611 | 345/55 |
| 2015/0187303 A1* | 7/2015 | Choi | G09G 3/20 | 345/87 |
| 2015/0194122 A1* | 7/2015 | Kim | G09G 3/3614 | 345/99 |

(Continued)

FOREIGN PATENT DOCUMENTS

| | | |
|---|---|---|
| KR | 10-0701065 B1 | 3/2007 |
| KR | 10-1469468 B1 | 12/2014 |

(Continued)

*Primary Examiner* — Kenneth Bukowski
(74) *Attorney, Agent, or Firm* — F. CHAU & ASSOCIATES, LLC

(57) ABSTRACT

A display device including: a pixel unit partitioned into a plurality of blocks including at least one scan line, the pixel unit including pixels connected to the scan line and a data line in each of the blocks; a gamma voltage supplier configured to generate a gamma voltage, based on a gamma value; a data driver configured to generate a data signal to be supplied to the data line, using the gamma voltage; and a timing controller configured to supply different gamma values to at least two blocks among the blocks, each of the different gamma values corresponding to the same grayscale.

20 Claims, 12 Drawing Sheets

(56) References Cited

U.S. PATENT DOCUMENTS

| | | | | |
|---|---|---|---|---|
| 2017/0316744 | A1* | 11/2017 | Oh | G09G 3/2007 |
| 2018/0268780 | A1* | 9/2018 | Bae | G09G 5/026 |
| 2020/0211441 | A1* | 7/2020 | Ahn | G09G 3/2003 |
| 2021/0012705 | A1* | 1/2021 | Pyun | G09G 3/32 |
| 2021/0319733 | A1* | 10/2021 | Kim | G09G 3/035 |
| 2022/0406239 | A1 | 12/2022 | Liao et al. | |
| 2023/0030225 | A1* | 2/2023 | Lee | G09G 3/3426 |

FOREIGN PATENT DOCUMENTS

| | | | |
|---|---|---|---|
| KR | 10-2018-0089917 | A | 8/2018 |
| KR | 10-2022-0039897 | A | 3/2022 |
| KR | 10-2022-0068778 | A | 5/2022 |
| KR | 10-2518740 | B1 | 4/2023 |

* cited by examiner

130: 132, 134

140: 142, 144

DISPLAY DEVICE AND METHOD OF DRIVING THE SAME

CROSS-REFERENCE TO RELATED APPLICATION

The present application claims priority under 35 U.S.C. § 119(a) to Korean patent application No. 10-2023-0166859, filed on Nov. 27, 2023 in the Korean Intellectual Property Office, the disclosure of which is incorporated by reference herein in its entirety.

1. TECHNICAL FIELD

The present disclosure relates to a display device and a method of driving the same.

2. DISCUSSION OF RELATED ART

As information technologies advance, the significance of display devices, which serve as intermediaries between users and information, grows. Consequently, the use of display devices, including liquid crystal display devices and organic light emitting display devices, is on the rise.

A display device can receive data from a host, convert the data into a data signal, and then transmit the data signal to pixels, enabling the display of a predetermined image on a pixel unit. The display device may generate a data signal using a gamma voltage that corresponds to a gamma value. However, applying the same gamma value (or gamma voltage) to all areas of a display panel can result in pixels producing varying luminances in response to the same data signal. This variation is often due to factors such as the load on data lines, pixel load, and variations in the manufacturing process.

SUMMARY

Embodiments of the present disclosure provide a display device and its driving method, wherein different gamma values are applied to areas of a display panel (or pixel unit). This approach ensures that pixels generate light with the same luminance in response to the same data signal.

In accordance with an embodiment of the present disclosure, there is provided a display device including: a pixel unit partitioned into a plurality of blocks including at least one scan line, the pixel unit including pixels connected to the scan line and a data line in each of the blocks; a gamma voltage supplier configured to generate a gamma voltage, based on a gamma value; a data driver configured to generate a data signal to be supplied to the data line, using the gamma voltage; and a timing controller configured to supply different gamma values to at least two blocks among the blocks, each of the different gamma values corresponding to the same grayscale.

The gamma voltage supplier generates different gamma voltages, which correspond to the same grayscale, based on the different gamma values.

The data driver generates data signals having different voltages, which are to be supplied to the at least two blocks, each of the data signals corresponding to the same grayscale.

The timing controller supplies the different gamma values to the at least two blocks to compensate for a load of the data line.

The blocks include an odd-numbered block including an odd-numbered scan line and an even-numbered block including an even-numbered scan line.

The timing controller supplies an odd gamma value, corresponding to the odd-numbered block, and supplies an even gamma value different from the odd gamma value, corresponding to the even-numbered block.

The pixel unit includes a plurality of areas including at least one odd-numbered block and at least one even-numbered block.

The timing controller supplies different even gamma values and different odd gamma values to their respective areas.

The pixel unit has widths that are at least partially different, and areas of at least two blocks among the blocks are different.

The timing controller supplies the different gamma values to the at least two blocks with the different areas.

The timing controller includes: a look-up table configured to store the gamma value; and a gamma value supplier configured to supply, to the gamma voltage supplier, the gamma value corresponding to a position of a block to which the data signal is supplied.

The gamma value supplier determines the position of the block to which the data signal is supplied, using at least one of a data enable signal and a horizontal synchronization signal.

When the gamma value corresponding to a first portion of the blocks is stored in the look-up table, the gamma value supplier generates the gamma value corresponding to a second portions of the blocks through interpolation.

In accordance with an embodiment of the present disclosure, there is provided a method of driving a display device, the method including: generating a first block gamma voltage, based on a first block gamma value; generating a first data signal, corresponding to the first block gamma voltage; supplying the first data signal to first pixels included in a first block; generating a second block gamma voltage, based on a second block gamma value different from the first block gamma value; generating a second data signal, corresponding to the second block gamma voltage; and supplying the second data signal to second pixels included in a second block, wherein the first pixels are supplied with the first data signal having a first voltage, and the second pixels are supplied with the second data signal having a second voltage different from the first voltage, the first data signal and the second data signal corresponding to the same grayscale.

Each of the first block and the second block includes at least one scan line.

The first block includes an odd-numbered scan line, and the second block includes an even-numbered scan line.

An area of the first block and an area of the second block are different from each other.

The first block gamma value and the second block gamma value are set such that light with the same luminance is generated in the first pixel and the second pixel.

The method further including determining whether the first data signal or the second data signal has been supplied, using at least one of a data enable signal and a horizontal synchronization signal.

The method further including storing the first block gamma value and the second block gamma value in a look-up table.

DETAILED DESCRIPTION OF THE EMBODIMENTS

Figure 1:
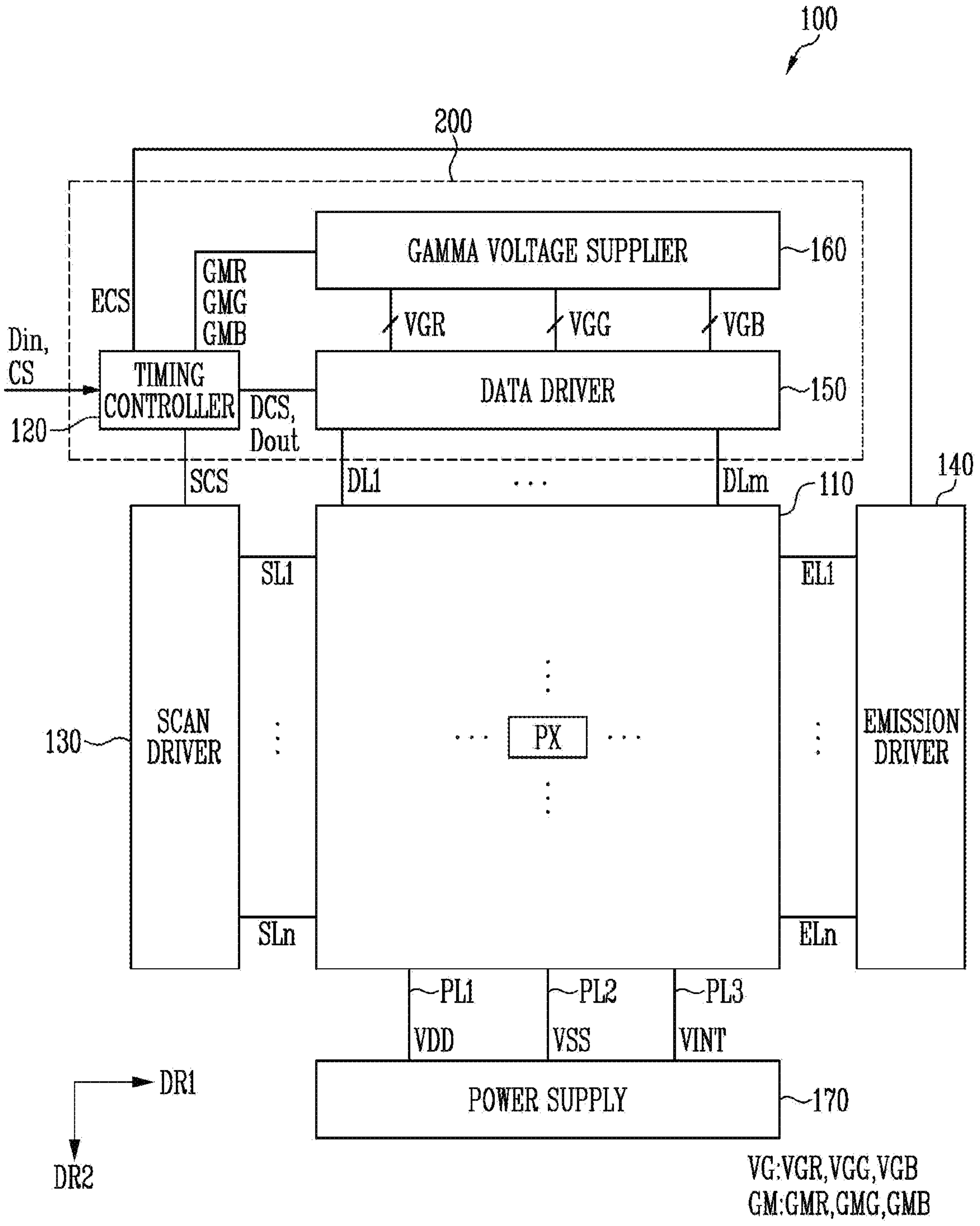
FIG. 1 is a diagram illustrating a display device in accordance with an embodiment of the present disclosure.

Hereinafter, example embodiments of the present disclosure will be described in detail with reference to the accompanying drawings. The present disclosure may be implemented in various different forms and is not limited to the embodiments set forth herein.

In the drawings, dimensions may be exaggerated for clarity of illustration. Like reference numerals may refer to like elements throughout the specification. It will also be understood that when an element is referred to as being “between” two elements, it can be the only element between the two elements, or one or more intervening elements may also be present.

Herein, the expression “equal” may mean “substantially equal.” For example, this may mean equality to a degree to which those skilled in the art can understand the equality.

Some embodiments are described in the accompanying drawings in relation to functional blocks, units, and/or modules. Those skilled in the art will understand that these blocks, units, and/or modules are physically implemented by logic circuits, individual components, microprocessors, hardwired circuits, memory elements, line connections, and other electronic circuits. These may be formed by using semiconductor-based manufacturing techniques or other manufacturing techniques. In the case of blocks, units, and/or modules implemented by microprocessors or other similar hardware, the units, and/or modules may be programmed and controlled by using software, to perform various functions discussed in the present disclosure, and selectively driven by firmware and/or software. In addition, each block, each unit, and/or each module may be implemented by dedicated hardware or by a combination of dedicated hardware to perform some functions of the block, the unit, and/or the module and a processor (e.g., one or more programmed microprocessors and associated circuitry) to perform other functions of the block, the unit, and/or the module. In some embodiments, the blocks, the units, and/or the modules may be physically separated into two or more individual blocks, two or more individual units, and/or two or more individual modules. In addition, in some embodiments, the blocks, the units, and/or the modules may be physically separated into more complex blocks, more complex units, and/or more complex modules.

The term “connection” between two components may include both an electrical connection and a physical connection, but the present disclosure is not necessarily limited thereto. For example, the term “connection” used based on circuit diagrams may mean an electrical connection, and the term “connection” used based on sectional and plan views may mean a physical connection.

It will be understood that, although the terms “first,” “second,” etc. may be used herein to describe various elements, these elements should not be limited by these terms. These terms are used to distinguish one element from another element. Thus, a “first” element discussed below could also be termed a “second” element.

Furthermore, each embodiment disclosed below may be independently embodied or combined with at least another embodiment.

FIG. 1 is a diagram illustrating a display device in accordance with an embodiment of the present disclosure.

Referring to FIG. 1, the display device 100 in accordance with the embodiment of the present disclosure may include a pixel unit 110 (or display panel), a driving circuit unit 200, a scan driver 130, an emission driver 140, and a power supply 170. The driving circuit unit 200 may include a timing controller 120, a data driver 150, and a gamma voltage supplier 160. In an embodiment, the timing controller 120, the data driver 150, and the gamma voltage supplier 160 may be configured into one integrated circuit (IC). In an embodiment, functions of at least some of the timing controller 120, the data driver 150, and the gamma voltage supplier 160 may be included in one IC.

The pixel unit 110 may display an image. The pixel unit 110 may be any one of an organic light emitting display panel, a liquid crystal display panel, an electrophoretic display panel, and an inorganic light emitting display panel. The pixel unit 110 may include pixels PX connected to scan lines SL1 to SLn, data lines DLI to DLm, emission control lines EL1 to ELn, and power lines PL1, PL2, and PL3 (n and m are natural numbers of 2 or more).

The pixels PX may be disposed in areas partitioned by the scan lines SL1 to SLn and the data line DLI to DLm. Each of the pixels PX may be connected to at least one of the scan lines SL1 to SLn, any one of the data lines DLI to DLm, and any one of the emission control lines EL1 to ELn. In an example, a pixel PXij (see FIG. 12) located on an ith horizontal line and a jth vertical line may be connected to an (i−1)th scan line SLi−1, an ith scan line SLi, a jth data line DLj, and an ith emission control line ELi. The pixel PXij may receive power via the power lines PL1, PL2 and PL3.

Each of the pixels PX may be electrically connected between a first power line PL1 and a second power line PL2. A first driving power source VDD may be applied to the first power line PL1, and a second driving power source VSS may be applied to the second power line PL2. The first driving power source VDD may be a power source which supplies a driving current to the pixels PX, and the second driving power source VSS may be a power source supplied with the driving current. The first driving power source VDD may be set to a voltage higher than a voltage of the second driving power source VSS in an emission period of the pixels PX.

Each of the pixels PX may be supplied with a data signal from a data line connected thereto when a scan signal (or enable scan signal) is supplied to a scan line connected thereto. The pixel, when supplied with the data signal, can emit light with a luminance corresponding to the data signal to the exterior (or outside). Each of the pixels PX may emit, to the outside, light of any one of a first color, a second color, and a third color. Accordingly, the pixels PX may include pixels of the first color, pixels of the second color, and pixels of the third color. The first color, the second color, and the third color may be different colors. As an example, the first color, the second color, and the third color may be red, green, and blue, respectively. In another embodiment, the first color, the second color, and the third color may be magenta, cyan, and yellow, respectively.

Additionally, signal lines (e.g., a scan line, a data line, and an emission control line) connected to each of the pixels PX and a driving method may be changed based on a structure of the pixel.

The scan driver 130 may generate a scan signal, corresponding to a scan driving signal SCS from the timing controller 120, and sequentially supply the scan signal to the scan lines SL1 to SLn. As an example, the timing controller 120 may supply, to the scan driver 130, the scan driving signal SCS including a scan start signal, a clock signal, and the like. The scan driver 130 may be implemented as a shift register which sequentially generates and outputs the scan signal while shifting the scan start signal, corresponding to the clock signal.

The emission driver 140 may generate an emission control signal, corresponding to an emission driving signal ECS from the timing controller 120, and sequentially supply the emission control signal to the emission control lines EL1 to ELn. As an example, the timing controller 120 may supply, to the emission driver 140, the emission driving signal ECS including an emission start signal, a clock signal, and the like. The emission driver 140 may be implemented as a shift register which sequentially generates and outputs the emission control signal while shifting the emission start signal, corresponding to the clock signal.

The scan driver 130 and the emission driver 140 may be formed together with the pixels PX on the pixel unit 110. However, the present disclosure is not limited thereto. For example, the scan driver 130 and/or the emission driver 140 may be mounted on a circuit film, and be connected to the timing controller 120 via at least one circuit film and a printed circuit board.

The data driver 150 may be supplied with a data driving signal DCS and output data Dout from the timing controller 120. The data driving signal DCS may include a sampling signal and/or timing signals, used to drive the data driver 150. Additionally, the data driver 150 may be supplied with a gamma voltage VG from the gamma voltage supplier 160.

The data driver 150 may generate a data signal by selecting a gamma voltage VG corresponding to a grayscale of the output data Dout. The data driver 150 may supply the data signal by using a horizontal line as a unit. The term "horizontal line" can refer to a row where pixels connected to the same scan line are arranged.

The gamma voltage VG may include a first gamma voltage VGR, a second gamma voltage VGG, and a third gamma voltage VGB. The first gamma voltage VGR may correspond to a pixel of the first color, and the data driver 150 may generate a data signal to be supplied to the pixel of the first color, using the first gamma voltage VGR. The second gamma voltage VGG may correspond to a pixel of the second color, and the data driver 150 may generate a data signal to be supplied to the pixel of the second color, using the second gamma voltage VGG. The third gamma voltage VGB may correspond to a pixel of the third color, and the data driver 150 may generate a data signal to be supplied to the pixel of the third color, using the third gamma voltage VGB. Each of the first gamma voltage VGR, the second gamma voltage VGG, and the third gamma voltage VGB may include gamma voltages respectively corresponding to grayscales (e.g., 256 grayscales) displayed in the pixel PX.

The gamma voltage supplier 160 may be supplied with a gamma value GM from the timing controller 120, and generate a gamma voltage VG, corresponding to the gamma value GM. In an embodiment, the gamma voltage supplier 160 may change a voltage value of the gamma voltage VG, corresponding to the gamma value GM. The gamma value GM may include a first gamma value GMR, a second gamma value GMG, and a third gamma value GMB.

The first gamma value GMR may correspond to a pixel of the first color, and the gamma voltage supplier 160 may generate a first gamma voltage VGR, based on the first gamma value GMR. The second gamma value GMG may correspond to a pixel of the second color, and the gamma voltage supplier 160 may generate a second gamma voltage VGG, based on the second gamma value GMG. The third gamma value GMB may correspond to a pixel of the third color, and the gamma voltage supplier 160 may generate a third gamma voltage VGB, based on the third gamma value GMB.

The timing controller 120 may receive input data Din and a control signal CS from a host system through an interface. In an example, the timing controller 120 may receive the input data Din and the control signal CS from at least one of a Graphics Processing Unit (GPU), a Central Processing Unit (CPU), and an Application Processor (AP), which are included in the host system. Various signals including a clock signal may be included in the control signal CS.

The timing controller 120 may generate the scan driving signal SCS, the data driving signal DCS, and the emission driving signal ECS, based on the control signal CS. The scan driving signal SCS, the data driving signal DCS, and the emission driving signal ECS may be supplied to the scan driver 130, the data driver 150, and the emission driver 140, respectively.

The timing controller 120 may realign the input data Din to be suitable for specifications of the display device 100. Additionally, the timing controller 120 may generate the output data Dout by correcting the input data Din, and supply the output data Dout to the data driver 140. In an embodiment, the timing controller 120 may correct the input data Din, which corresponds to an optical measurement result measured obtained in a processing procedure.

The power supply 170 may generate various power sources necessary for the operation of the display device 100. In an example, the power supply 170 may generate the first driving power source VDD and the second driving power source VSS. The power supply 170 may further generate various power sources, e.g., an initialization power source VINT, tailored to the structure of the pixels PX.

The first driving power source VDD generated by the power supply 170 may be supplied to the first power line PL1, the second driving power source VSS generated by the power supply 170 may be supplied to the second power line PL2, and the initialization power source VINT generated by the power supply 170 may be supplied to a third power line PL3. The first power line PL1, the second power line PL2, and the third power line PL3 may be commonly connected to the pixels PX, but the embodiment of the present disclosure is not limited thereto.

In an embodiment, the first power line PL1 may be configured with a plurality of power lines, and the plurality of power lines may be connected to different pixels PX. In an embodiment, the second power line PL2 may be configured with a plurality of power lines, and the plurality of power lines may be connected to different pixels PX. In an embodiment, the third power line PL3 may be configured with a plurality of power lines, and the plurality of power lines may be connected to different pixels PX.

Figure 2:
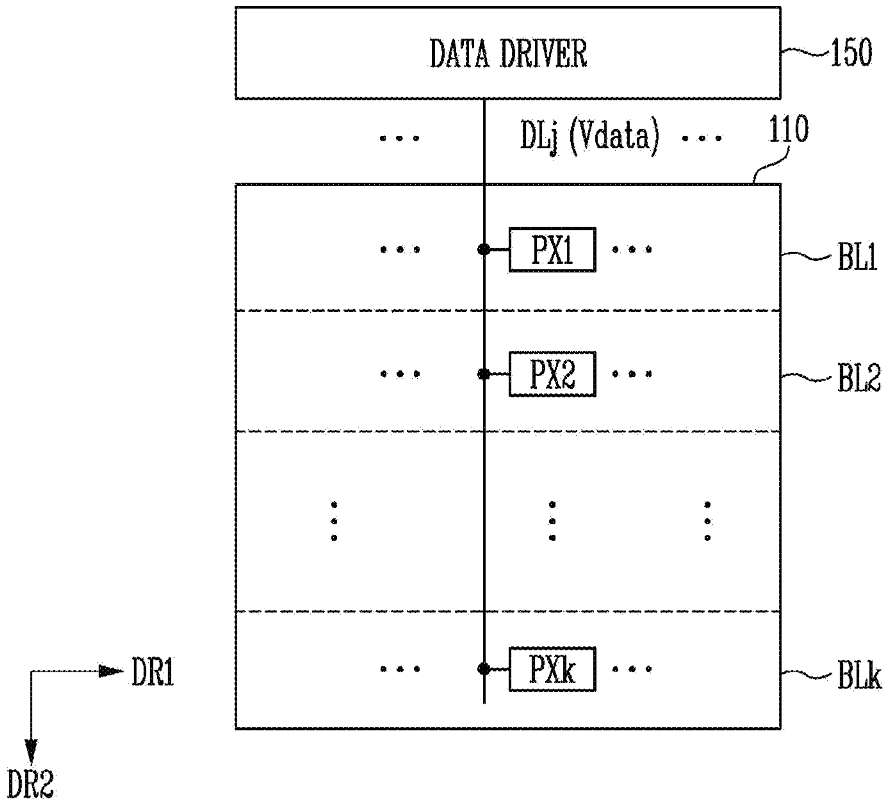
FIG. 2 is a diagram illustrating a pixel unit in accordance with an embodiment of the present disclosure.

FIG. 2 is a diagram illustrating a pixel unit in accordance with an embodiment of the present disclosure. For convenience of description, one data line DLj will be illustrated in FIG. 2.

Referring to FIG. 2, in an embodiment of the present disclosure, the pixel unit 110 may include a plurality of blocks BL1, BL2, . . . , and BLk (k is a natural number of 3 or more). Each of the blocks BL1 to BLk may include at least one horizontal line. In an example, each of the blocks BL1 to BLk may include at least one scan line (at least one of SL1 to SLn). For this purpose, the blocks BL1 to BLk can be divided along the horizontal line direction, e.g., a first direction DR1. The number of pixels PX included in the respective blocks BL1 to BLk may be equal to or different from one another.

The blocks BL1 to BLk may be partitioned based on distances from the data driver 150. As an example, a first block BL1 may be adjacent (e.g., neighboring) to the data driver 150, and a kth block BLk may be spaced apart from the data driver 150. A second block BL2 may be disposed between the first block BL1 and the kth block BLk.

The first block BL1 may include at least one scan line (at least one of SL1 to SLn), and include first pixels PX1. The second block BL2 may include at least one scan line (at least one of SL1 to SLn), and include second pixels PX2. The kth block BLk (k is a natural number of 3 or more) may include at least one scan line (at least one of SL1 to SLn), and include kth pixels PXk. The designation of the first pixel PX1, the second pixel PX2, and the kth pixel PXk highlights that the first pixel PX1, the second pixel PX2, and the kth pixel PXk are located in different blocks. The first PX1, the second pixel PX2, and the kth pixel PXk may be substantially identical to the pixel PX shown in FIG. 1.

A data line DLj may be disposed in a vertical line direction, e.g., a second direction DR2 in the pixel unit 110. As an example, the second direction DR2 may be a direction different from the first direction DR1. The second direction DR2 may be a direction orthogonal to the first direction DR1. As an example, the first direction DR1 may be a horizontal direction, and the second direction DR2 may be a vertical direction.

When the data line DLj is disposed in the second direction DR2, the data line DLj may be electrically connected to the first pixel PX1, the second pixel PX2, and the kth pixel PXk. The data driver 150 may supply a data signal Vdata to each of the first pixel PX1, the second pixel PX2, and the kth pixel PXk via the data line DLj.

The first pixel PX1 to the kth pixel PXk may be located at different distances from the data driver 150. As an example, a distance between the first pixel PX1 and the data driver 150 may be closer than a distance between the kth pixel PXk and the data driver 150. As an example, a distance from the second pixel PX2 to the data driver 150 may be greater than the distance from the first pixel PX1 to the data driver 150. Additionally, the distance from the second pixel PX2 to the data driver 150 may be closer than the distance from the kth pixel PXk to the data driver 150.

Loads (or resistances) of the data line DLj in the first pixel PX1, the second pixel PX2, and the kth pixel PXk may be different from one another. As an example, the data signal Vdata supplied to the first pixel PX1 may be supplied with a first load, and the data signal Vdata supplied to the second pixel PX2 may be supplied with a second load greater than the first load. As an example, the data signal Vdata supplied to the kth pixel PXk may be supplied with a kth load greater than the second load. In other words, the loads on the data line DLj connected to the pixels PX1, PX2, and PXk can vary depending on their distances from the data driver 150.

As such, when the data signal Vdata supplied to each of the pixels PX1, PX2, and PXk is supplied with different loads, lights of different luminances may be generated in the pixels PX1, PX2, and PXk even when the same data signal is supplied. In the embodiment of the present disclosure, there is disclosed a method for compensating for a load variation of the data line DLj.

Figure 3:
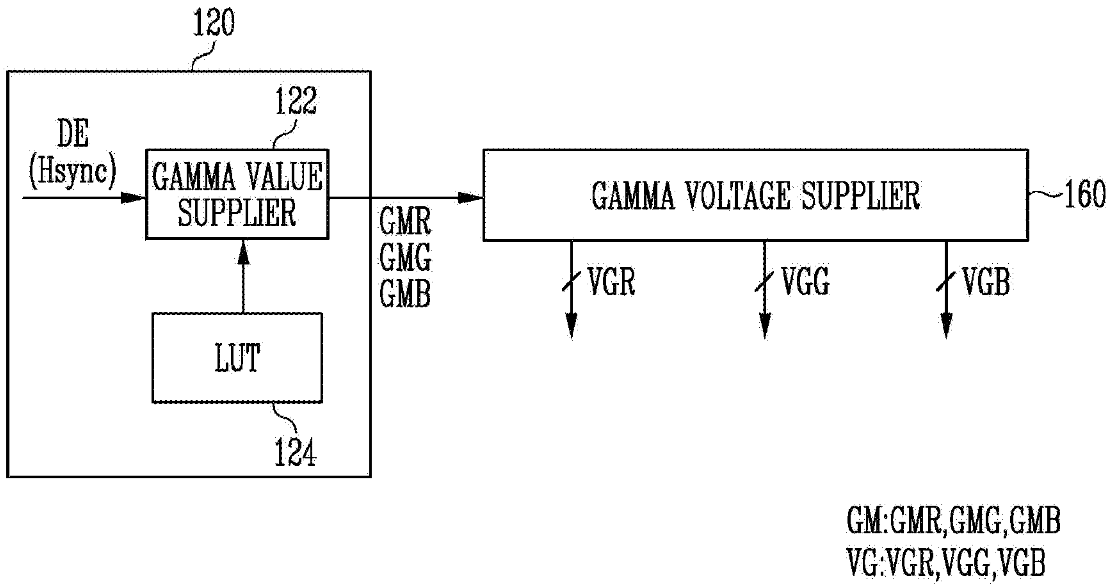
FIG. 3 is a diagram illustrating a timing controller in accordance with an embodiment of the present disclosure.

FIG. 3 is a diagram illustrating a timing controller in accordance with an embodiment of the present disclosure.

Referring to FIG. 3, the timing controller 120 in accordance with the embodiment of the present disclosure may include a gamma value supplier 122 and a Look-Up Table (LUT) 124.

A gamma value GM may be stored in the LUT 124. In an embodiment, various gamma values GM may be stored in the LUT 124 such that voltages of different data signals can be generated corresponding to the same grayscale. In other words, different gamma values GM can be stored in the LUT 124, enabling the generation of voltages for varying data signals that correspond to the same grayscale level. In an embodiment, various first, second, and third gamma values GMR, GMG, and GMB may be stored in the LUT 124. This allows for the generation of voltages for different data signals within the pixels of the first color, the second color, and third color, ensuring they correspond to the same grayscale.

The gamma value supplier 122 may determine a horizontal line (or any one of the blocks BL1 to BLk) to which a current data signal is supplied, by using a data enable signal DE (and/or a horizontal synchronization signal Hsync), and supply, to the gamma voltage supplier 160, a gamma value GM corresponding to the determined block (any one of BL1 to BLk). The gamma value supplier 122 may control the gamma value GM such that light with the same luminance can be generated in the pixels PX1 to PXk, irrespective of the loads on the data lines DLI to DLm.

The gamma voltage supplier 160 may supply a gamma voltage VG to the data driver 150, based on the gamma value GM. The gamma voltage supplier 160 may generate the gamma voltage VG, enabling the supply of voltages for different data signals to the respective blocks BL1 to BLk. This ensures that each block BL1 to BLk receives a voltage that corresponds to the same grayscale, based on the gamma value GM. In an embodiment, the gamma voltage supplier 160 may generate a first gamma voltage VGR, a second gamma voltage VGG, and a third gamma voltage VGB such that voltages for different data signals can be supplied to the respective blocks BL1 to BLk, ensuring that each block BL1 to BLk receives a voltage that corresponds to the same grayscale, based on the gamma value GM.

Figure 4:
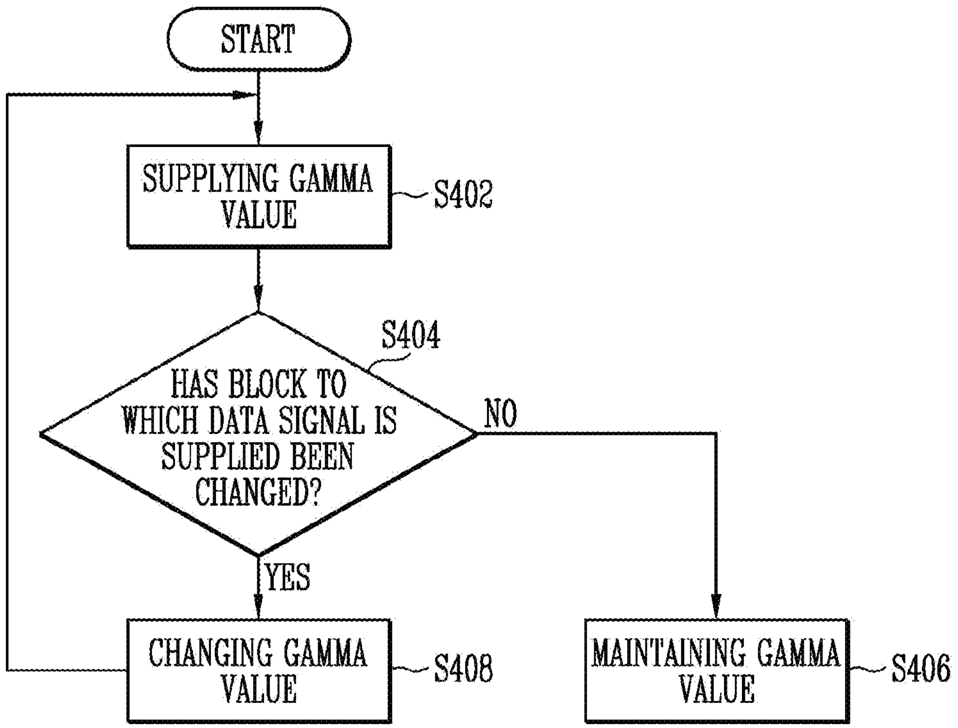
FIG. 4 is a diagram illustrating a method of driving the display device in accordance with an embodiment of the present disclosure.
Figure 5A:
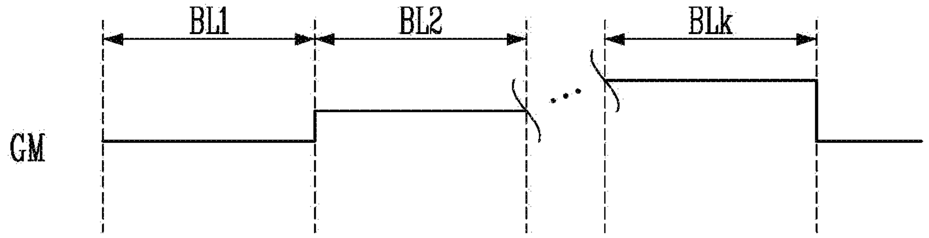
FIGS. 5A and 5B are diagrams illustrating a gamma value corresponding to the method shown in FIG. 4.
Figure 5B:
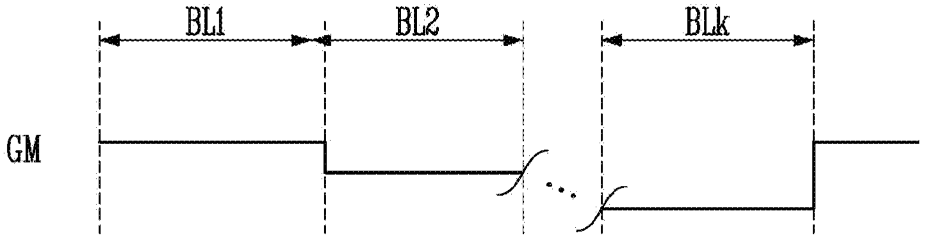

FIG. 4 is a diagram illustrating a method of driving the display device in accordance with an embodiment of the present disclosure. FIGS. 5A and 5B are diagrams illustrating a gamma value corresponding to the method shown in FIG. 4.

Referring to FIGS. 4 to 5B, when an image is displayed in the display device 100, the gamma value supplier 122 may supply a gamma value GM to the gamma voltage supplier 160 (S402). As an example, the gamma value supplier 122 may supply a gamma value GM corresponding to the first block BL1 to the gamma voltage supplier 160, at the start of a frame.

The gamma voltage supplier 160 supplied with the gamma value GM may generate a gamma voltage VG corresponding to the gamma value GM and supply the gamma voltage VG to the data driver 150. The data driver 150 may supply a data signal to the pixels PX1 located in the first block BL1, corresponding to the gamma value GM.

Next, the gamma value supplier 122 may determine a block (any one of BL1 to BLk) to which a current data signal is supplied, by using the data enable signal DE (and/or the horizontal synchronization signal Hsync) (S404). When the block (any one of BL1 to BLk) to which the data signal is supplied is not changed in the step S404, the gamma value supplier 122 may maintain the gamma value GM (S406).

When the block (any one of BL1 to BLk) to which the data signal is supplied is changed in the step S404, the gamma value supplier 122 may change the gamma value GM, and supply the changed gamma value GM to the gamma voltage supplier 160 (S408). After that, the gamma value supplier 122 may change the gamma value GM in units corresponding to each of the blocks BL1 to BLk and repeat the steps S402 to S408.

Meanwhile, the gamma value supplier 122 may control the gamma value GM such that light of the same luminance (or lights of similar luminances) is generated in the blocks BL1 to BLk (or the first pixel PX1, the second pixel PX2, and the kth pixel PXk), in response to the same data signal.

As an example, when the block (any one of BL1 to BLk) is changed in the step S404 as shown in FIG. 5A, the gamma value supplier 122 may increase the gamma value GM. As an example, when the block (any one of BL1 to BLk) is changed in the step S404 as shown in FIG. 5B, the gamma value supplier 122 may decrease the gamma value GM.

More specifically, the voltage of a data signal may be controlled depending on a type of a driving transistor included in each of the pixels PX. As an example, when an N-type driving transistor is provided, light with a higher luminance may be generated as the voltage of the data signal increases. When the block (any one of BL1 to BLk) is changed as shown in FIG. 5A, the gamma value supplier 122 may control the gamma value GM to increase such that a higher voltage of the data signal is supplied for the same grayscale.

As an example, when a P-type driving transistor is provided, light with a higher luminance may be generated as the voltage of the data signal decreases. When the block (any one of BL1 to BLk) is changed as shown in FIG. 5B, the gamma value supplier 122 may control the gamma value GM to decrease such that a lower voltage of the data signal is supplied for the same grayscale.

As described above, in the present disclosure, different gamma values GM are supplied in the units of the blocks BL1 to BLk, so that loads of the data lines DLI to DLm can be compensated. Accordingly, an image with a uniform luminance can be displayed on the pixel unit 110.

Figure 6A:
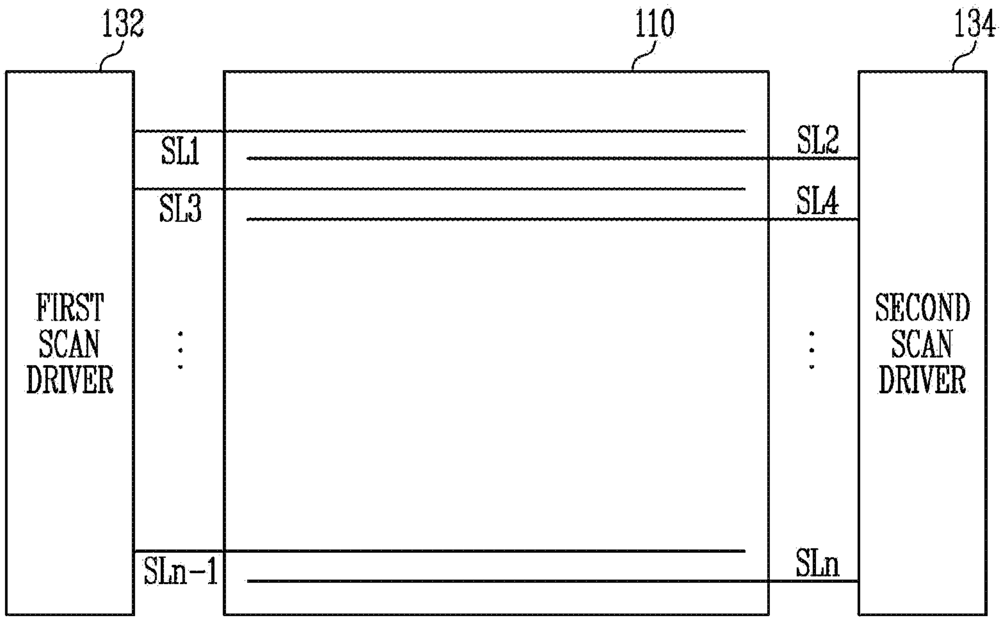
FIGS. 6A and 6B are diagrams illustrating a scan driver and an emission driver in accordance with an embodiment of the present disclosure.
Figure 6B:
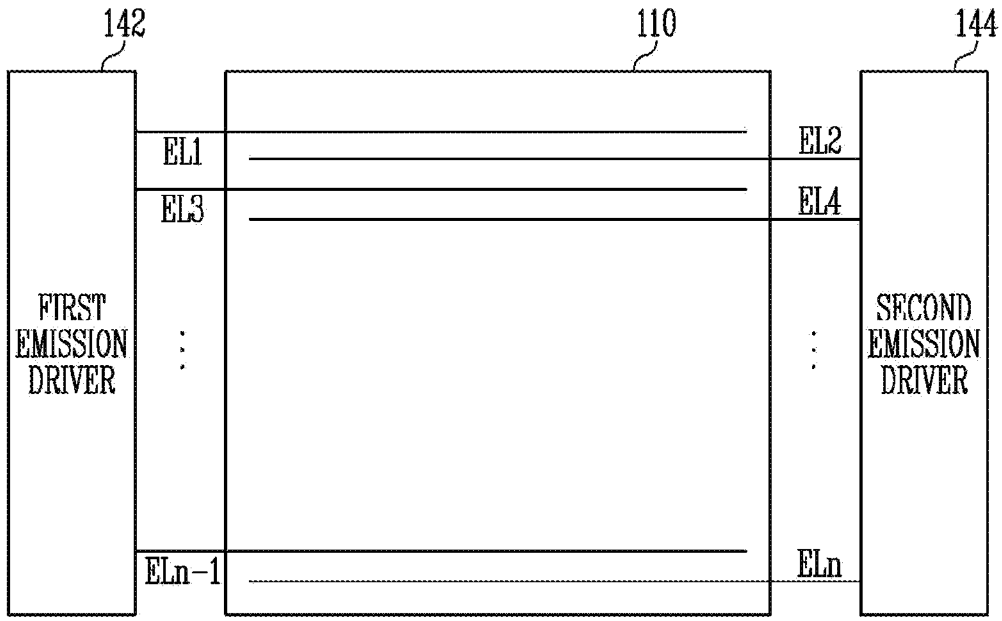

FIGS. 6A and 6B are diagrams illustrating a scan driver and an emission driver in accordance with an embodiment of the present disclosure. The display device 100 may be used for a compact wearable device including a watch (e.g., smart glasses, a smart band, an Internet of Things (IoT) device). When a display panel is applied to the compact wearable device, a bezel of the display panel is to be set thin. Accordingly, the scan driver 130 and/or the emission driver 140 may be disposed at both sides of the pixel unit 110 with the pixel unit 110 interposed therebetween as shown in FIGS. 6A and 6B.

Referring to FIG. 6A, the scan driver 130 in accordance with the embodiment of the present disclosure may be disposed at both sides of the pixel unit 110 with the pixel unit 110 interposed therebetween. As an example, a first scan driver 132 may be located at the left of the pixel unit 110, and supply a scan signal to odd-numbered scan lines SL1, SL3, . . . , and SLn−1. As an example, a second scan driver 134 may be located at the right of the pixel unit 110, and supply a scan signal to even-numbered scan lines SL2, SL4, . . . , and SLn.

Referring to FIG. 6B, the emission driver 140 in accordance with the embodiment of the present disclosure may be disposed at both sides of the pixel unit 110 with the pixel unit 110 interposed therebetween. As an example, a first emission driver 142 may be located at the left of the pixel unit 110, and supply an emission control signal to odd-numbered emission control lines EL1, EL3, . . . , and ELn−1. As an example, a second emission driver 144 may be located at the right of the pixel unit 110, and supply an emission control signal to even-numbered emission control lines EL2, EL4, . . . , and ELn.

When an odd-numbered horizontal line and an even-numbered horizontal line are driven by different drivers 132, 134, 142, and 144 as shown in FIGS. 6A and 6B, a luminance difference between the odd-numbered horizontal line and the even-numbered horizontal line may occur. As an example, although the same data signal is supplied, a luminance of light emitted from pixels PX located on the odd-numbered horizontal line and a luminance of light emitted from the pixels PX located on the even-numbered horizontal line may be different from each other.

Figure 7:
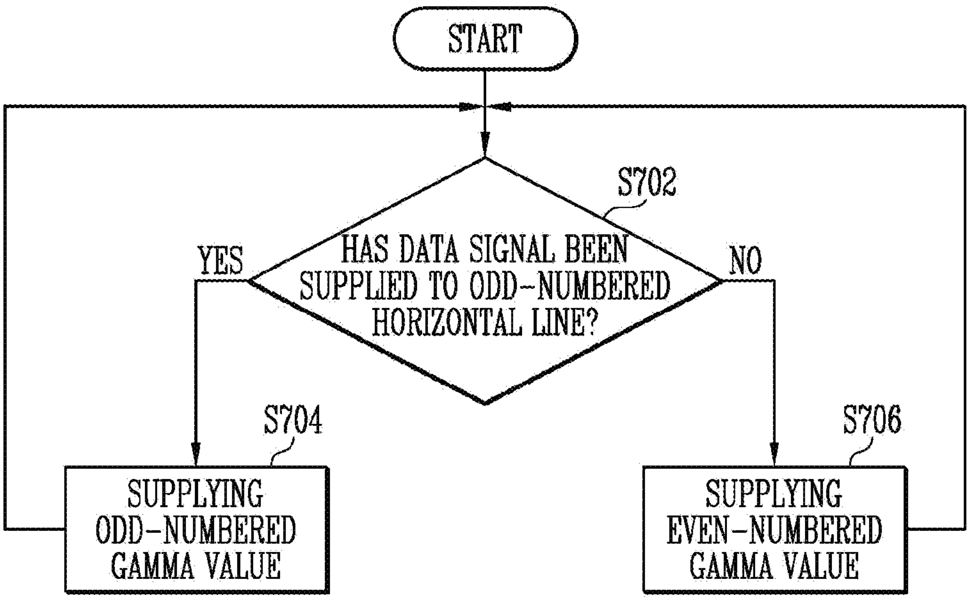
FIG. 7 is a diagram illustrating a method of driving the display device in accordance with an embodiment of the present disclosure.
Figure 8A:
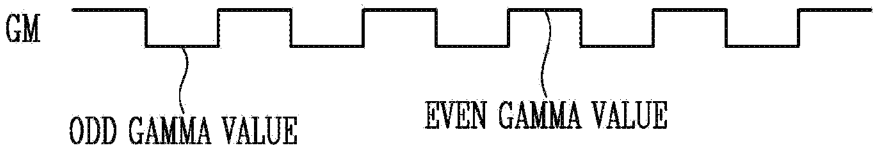
FIGS. 8A and 8B are diagrams illustrating a gamma value corresponding to the method shown in FIG. 7.
Figure 8B:
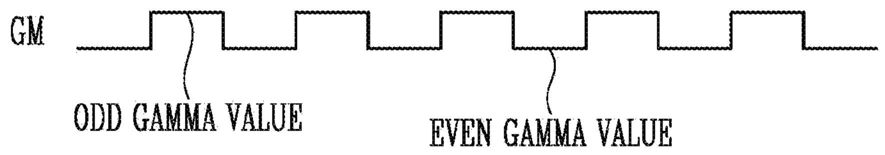

FIG. 7 is a diagram illustrating a method of driving the display device in accordance with an embodiment of the present disclosure. FIGS. 8A and 8B are diagrams illustrating a gamma value corresponding to the method shown in FIG. 7.

Referring to FIGS. 1, 3, and 7 to 8B, when an image is displayed in the display device 100, the gamma value supplier 122 in the timing controller 120 may supply a gamma value GM to the gamma voltage supplier 160. The gamma value supplier 122 may determine whether a data signal has been supplied to an odd-numbered horizontal line, by using the data enable signal DE (and/or the horizontal synchronization signal Hsync) (S702).

When the data signal is supplied to the odd-numbered horizontal line in the step S702, the gamma value supplier 122 may supply, to the gamma voltage supplier 160, an odd gamma value corresponding to the odd-numbered horizontal line (S704). When the data signal is not supplied to the odd-numbered horizontal line in the step S702 (e.g., when the data signal is supplied to an even-numbered horizontal line), the gamma value supplier 122 may supply, to the gamma voltage supplier 160, an even gamma value corresponding to the even-numbered horizontal line (S706).

The gamma voltage supplier 160 supplied with the odd gamma value may generate a gamma voltage VG corresponding to the odd gamma value and supply the gamma voltage VG to the data driver 150. The data driver 150 may generate a data signal to be supplied pixels PX located on the odd-numbered horizontal line, by using the gamma voltage VG. The gamma voltage supplier 160 supplied with the even gamma value may generate a gamma voltage VG corresponding to the even gamma value and supply the gamma voltage VG to the data driver 150. The data driver 150 may generate a data signal to be supplied to pixels PX located on the even-numbered horizontal line, by using the gamma voltage VG.

The gamma value supplier 122 has the ability to control both the odd and even gamma values. This ensures that light with the same luminance (or lights with similar luminances) is generated in response to the same data signal both in pixels PX located on odd-numbered horizontal line and in pixels PX located on even-numbered horizontal line. As an example, the odd gamma value and the even gamma value may have different values and be pre-stored in LUT 124. As an example, the odd gamma value may be smaller than the even gamma value as shown in FIG. 8A. For example, in FIG. 8A, the odd gamma value may correspond to logic low and the even gamma value may correspond to logic high. As an example, the odd gamma value may be greater than the even gamma value as shown in FIG. 8B. For example, in FIG. 8B, the odd gamma value may correspond to logic high and the even gamma value may correspond to logic low.

In the embodiment of the present disclosure, a method of controlling a gamma value in a block unit, which is described with reference to FIG. 2, may be applied to a method of controlling a gamma value, which is described with reference to FIGS. 6A to 8.

The pixel unit 110 may be partitioned in units of the blocks BL1 to BLk. In addition, the gamma value supplier 122 may supply an odd gamma value, corresponding to pixels PX located on an odd-numbered horizontal line in the same block (any one of BL1 to BLk), and supply an even gamma value, corresponding to pixels PX located on an even-numbered horizontal line in the same block (any one of BL1 to BLk). The odd gamma value and the even gamma value may be set as different values, and may be determined such that light with the same luminance (or lights with similar luminances) is generated in the pixels PX located on the odd-numbered horizontal line and the pixels PX located on the even-numbered horizontal line, corresponding to the same data signal.

Additionally, the gamma value supplier 122 may supply different odd gamma values and different even gamma values, corresponding to the respective blocks BL1 to BLk. As an example, the gamma value supplier 122 may supply different odd gamma values and different even gamma values in units of blocks such that light with the same luminance can be generated in the blocks BL1 to BLk.

Additionally, an odd-numbered horizontal line (or odd-numbered scan line) may be referred to as an odd-numbered block, and an even-numbered horizontal line (or even-numbered scan line) may be referred to as an even-numbered block. The pixel unit 110 may be partitioned into a plurality of areas including at least one odd-numbered block and at least one even-numbered block. An area may correspond to each of the blocks BL1 to BLn shown in FIG. 2. Different odd gamma values and different even gamma values may be supplied to the areas (or the blocks BL1 to BLk).

Figure 9:
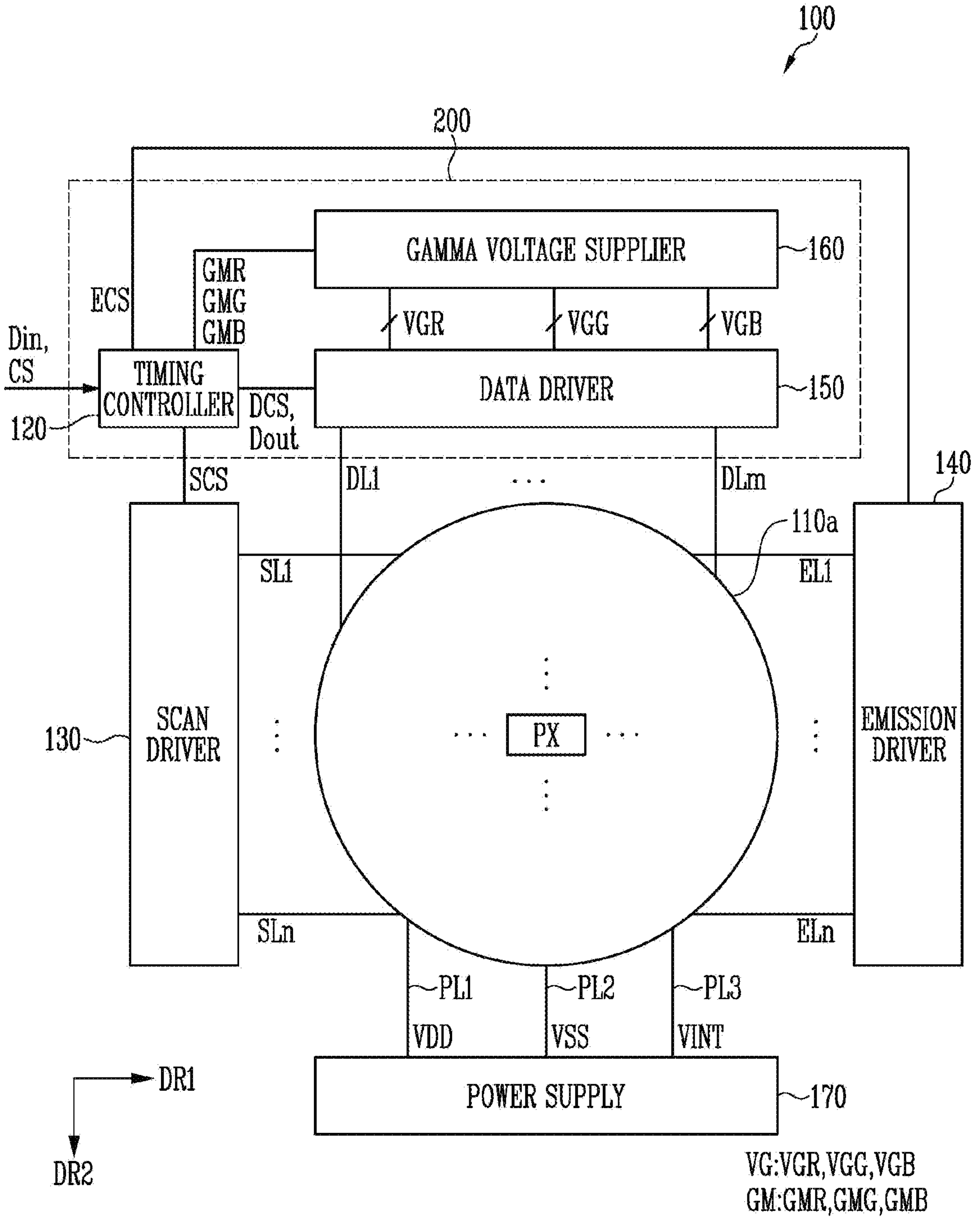
FIG. 9 is a diagram illustrating a display device in accordance with an embodiment of the present disclosure.

FIG. 9 is a diagram illustrating a display device in accordance with an embodiment of the present disclosure. In FIG. 9, overlapping descriptions of components identical to those shown in FIG. 1 may be omitted.

Referring to FIG. 9, the display device 100 in accordance with the embodiment of the present disclosure may include a pixel unit 110*a* (or display panel), a driving circuit unit 200, a scan driver 130, an emission driver 140, and a power supply 170. The driving circuit unit 200 may include a timing controller 120, a data driver 150, and a gamma voltage supplier 160.

The pixel unit 110*a* may display a predetermined image. To accomplish this, the pixel unit 110*a* may include pixels PX. The pixel unit 110*a* may be any one of an organic light emitting display panel, a liquid crystal display panel, an electrophoretic display panel, and an inorganic light emitting display panel. The pixel unit 110*a* may include pixels PX connected to scan lines SL1 to SLn, data lines DLI to DLm, emission control lines EL1 to ELn, and power lines PL1, PL2, and PL3.

The widths of pixel unit 110*a* may be configured to vary according to their positions. The widths of the pixel unit 110*a* may be determined based on the number of pixels PX located on horizontal lines. As an example, when the number of pixels PX located on horizontal lines are different from each other, the widths of the pixel unit 110*a* are different from each other.

The pixel unit 110*a* may have a circular shape, and accordingly, widths of the pixel unit 110 may be different from each other. However, the embodiment of the present disclosure is not limited thereto, and the pixel unit 110*a* may have different shapes, e.g., various shapes such as a polygon, a triangle, and a rhombus.

Figure 10:
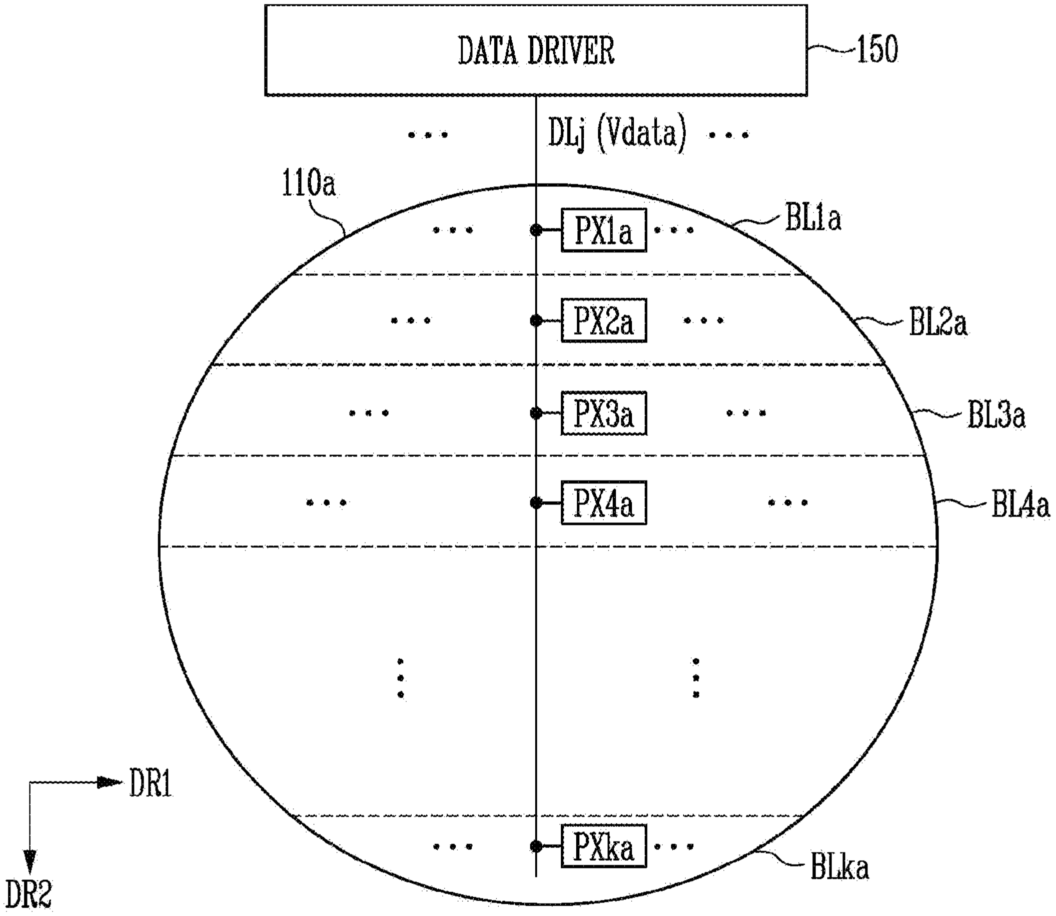
FIG. 10 is a diagram illustrating an embodiment of a pixel unit shown in FIG. 9.

FIG. 10 is a diagram illustrating an embodiment of the pixel unit shown in FIG. 9. For convenience of description, one data line DLj will be illustrated in FIG. 10.

Referring to FIG. 10, the pixel unit 110*a* in accordance with the embodiment of the present disclosure may include a plurality of blocks BL1*a*, BL2*a*, BL3*a*, BL4*a*, . . . , and BLka. Each of the blocks BL1*a* to BLka may include one horizontal line (or scan line). As an example, each of the blocks BL1*a* to BLka may include at least one scan line (at least one SL1 to SLn). The blocks BL1*a* to BLka may be partitioned in the horizontal line direction, e.g., the first direction DR1. The number of horizontal lines included in the respective blocks BL1*a* to BLka may be equal to or different from each other.

Since the pixel unit 110*a* has different widths according to positions thereof, each of the blocks BL1*a* to BLka have a different area as compared with at least another block. As an example, a first block BL1*a* may have an area smaller than an area of a second block BL2*a*, the second block BL2*a* may have an area smaller than an area of a third block BL3*a*, and the third block BL3*a* may have an area smaller than an area of a fourth block BL4*a*. Additionally, a kth block BLka may have the same area as the first block BL1*a*.

As such, when each of the blocks BL1*a* to BLka has a different area as compared with at least another block, lights with different luminances may be generated in at least one pixel among pixels PX1*a*, PX2*a*, PX3*a*, PX4*a*, . . . , and PXka, corresponding to the same data signal. As an example, when the blocks BL1*a* to BLka have different areas, the pixels PX1*a*, PX2*a*, PX3*a*, PX4*a*, . . . , and PXka included in the respective blocks BL1*a* to BLka may have different loads applied thereto, and accordingly, lights with different luminances may be generated in response to the same data signal.

As an example, a load of a scan line connected to a first pixel PX1*a* may be different from a load of a scan line connected to each of pixels PX2*a*, PX3*a*, PX4*a* included in blocks BL2*a*, BL3*a*, and BL4*a* having different areas. In addition, a load of a data line DLj connected to the first pixel PX1*a* may be different from a load of the data line DLj connected to each of pixels PX2*a* PX3*a*, PX4*a*, and PXka. In addition, when the blocks BL1*a* to BLka have different areas, voltages of the driving power sources VDD and VSS and the initialization power source VINT, which are supplied to the pixels PX1*a* to PXka may be different from each other. Consequently, in the embodiment of the present disclosure, a gamma value GM is controlled such that luminance variations do not occur in each of the blocks BL1*a* to BLka.

Figure 11A:
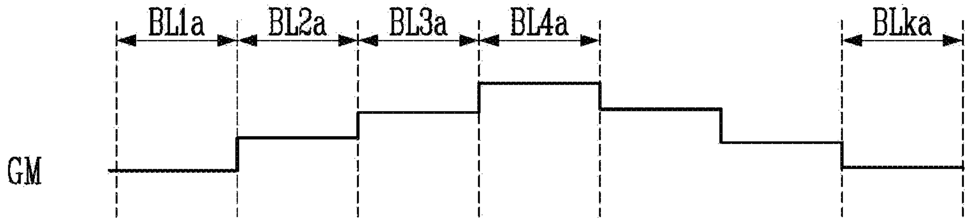
FIGS. 11A and 11B illustrate a gamma value supplied by a timing controller shown in FIG. 9.
Figure 11B:
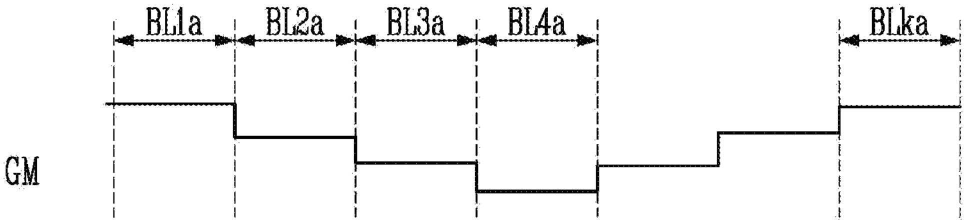

FIGS. 11A and 11B illustrate a gamma value supplied by the timing controller shown in FIG. 9.

Referring to FIGS. 3 and 9 to 11B, when an image is displayed in the display device 100, the gamma value supplier 122 may supply a gamma value GM to the gamma voltage supplier 160. As an example, the gamma value supplier 122 may supply a gamma value GM corresponding to the first block BL1*a* to the gamma voltage supplier 160, at the start of a frame.

The gamma voltage supplier 160 may generate a gamma voltage VG corresponding to the gamma value GM and supply the gamma voltage VG to the data driver 150. The data driver 150 may supply a data signal to pixels PX1*a* located in the first block BL1*a*, corresponding to the gamma value GM.

The gamma value supplier 122 may determine a block (any one of BL1*a* to BLka) to which a current data signal is supplied, using the data enable signal DE (and/or the horizontal synchronization signal Hsync). When the block to which the data signal is supplied changes to the second block BL2*a*, the gamma value supplier 122 may change the gamma value GM, and supply the changed gamma value GM to the gamma voltage supplier 160. The changed gamma value GM may be predetermined such that light of the same luminance or lights of similar luminances can be generated in the first pixel PX1*a* and the second pixel PX2*a*, in response to the same data signal.

The gamma value supplier 122 may set different gamma values GM for each block, ranging from the third block BL3*a* to the kth block BLka. A gamma value GM corresponding to each of the blocks BL1*a* to BLka may be set such that light of the same luminance or lights of similar luminances can be generated in the pixels PX1*a* to PXka included in the respective blocks BL1*a* to BLka.

As an example, the gamma value GM may increase while moving to the fourth block BL4*a* from the first block BL1*a* and to decrease while moving to the kth block BLka from the fourth block BL4*a* as shown in FIG. 11A. This change in the gamma value GM may correspond to the area of each of the blocks BL1*a* to BLka.

As an example, the gamma value GM may decrease while moving to the fourth block BL4*a* from the first block BL1*a* and to increase while moving to the kth block BLka from the fourth block BL4*a* as shown in FIG. 11B. This change in the gamma value GM may correspond to the area of each of the blocks BL1*a* to BLka.

A gamma value corresponding to some blocks may be stored in the LUT 124, and a gamma value corresponding to the other blocks may be generated through interpolation in the gamma value supplier 122. As an example, a gamma value corresponding to the first block BL1*a*, the fourth block BL4*a*, and the kth block BLka may be stored in the LUT 124, and a gamma value corresponding to the other blocks BL2*a*, BL3*a*, . . . may be generated through interpolation in the gamma value supplier 122.

Figure 12:
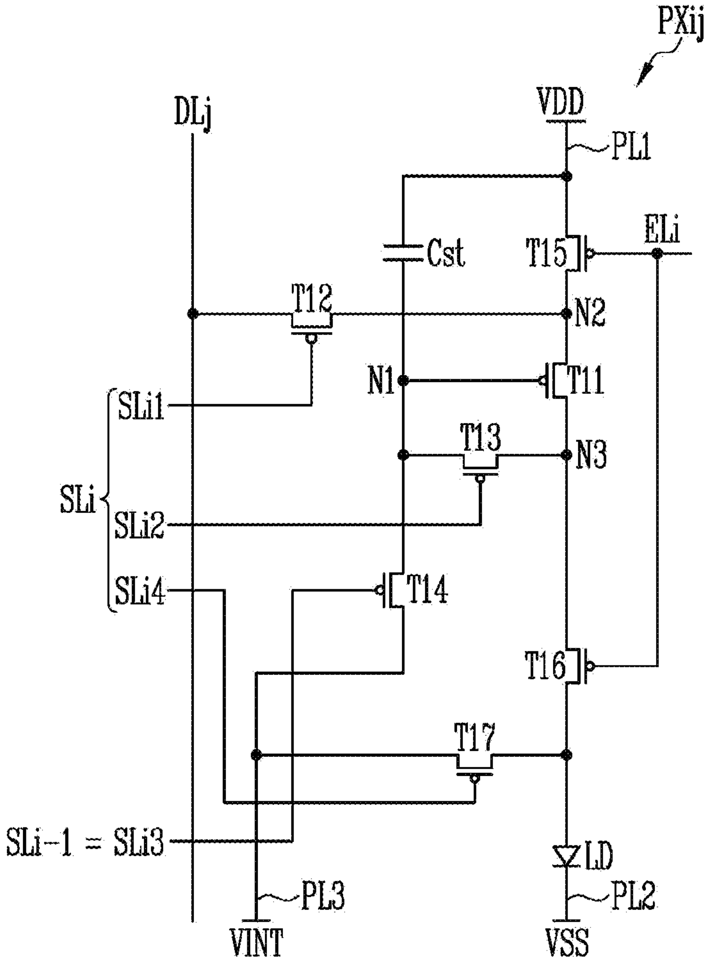
FIG. 12 is a diagram illustrating a pixel in accordance with an embodiment of the present disclosure.

FIG. 12 is a diagram illustrating a pixel in accordance with an embodiment of the present disclosure.

Referring to FIG. 12, the pixel PXij in accordance with the embodiment of the present disclosure may include transistors T11, T12, T13, T14, T15, T16, and T17, a storage capacitor Cst, and a light emitting element LD.

Hereinafter, a circuit implemented with a P-type transistor is described as an example. However, those skilled in the art may design a circuit implemented with an N-type transistor by changing the polarity of a voltage applied to a gate terminal. Similarly, those skilled in the art may design a circuit implemented with a combination of the P-type transistor and the N-type transistor. The transistor may be configured in various forms including a Thin Film Transistor (TFT), a Field Effect Transistor (FET), a Bipolar Junction Transistor (BJT), and the like.

A gate electrode of an eleventh transistor T11 may be connected to a first node N1, a first electrode of the eleventh transistor T11 may be connected to a second node N2, and a second electrode of the eleventh transistor T11 may be connected to a third node N3. The eleventh transistor T11 may be referred to as a driving transistor.

A gate electrode of a twelfth transistor T12 may be connected to a scan line SLi1, a first electrode of the twelfth transistor T12 may be connected to a data line DLj, and a second electrode of the twelfth transistor T12 may be connected to the second node N2. A gate electrode of a thirteenth transistor T13 may be connected to a scan line SLi2, a first electrode of the thirteenth transistor T13 may be connected to the first node N1, and a second electrode of the thirteenth transistor T13 may be connected to the third node N3.

A gate electrode of a fourteenth transistor T14 may be connected to a scan line SLi3, a first electrode of the fourteenth transistor T14 may be connected to the first node N1, and a second electrode of the fourteenth transistor T14 may be connected to the third power line PL3. A gate electrode of the fifteenth transistor T15 may be connected to an emission control line ELi, a first electrode of the fifteenth transistor T15 may be connected to the first power line PL1, and a second electrode of the fifteenth transistor T15 may be connected to the second node N2.

A gate electrode of the sixteenth transistor T16 may be connected to the emission control line ELi, a first electrode of the sixteenth transistor T16 may be connected to the third node N3, and a second electrode of the sixteenth transistor T16 may be connected to an anode of the light emitting element LD. In an embodiment, the fifteenth transistor T15 and the sixteenth transistor T16 may be connected to different emission control lines.

A gate electrode of a seventeenth transistor T17 may be connected to a scan line SLi4, a first electrode of the seventeenth transistor T17 may be connected to the third power line PL3, and a second electrode of the seventeenth transistor T17 may be connected to the anode of the light emitting element LD. A first electrode of the storage capacitor Cst may be connected to the first power line PL1, and a second electrode of the storage capacitor Cst may be connected to the first node N1.

The anode of the light emitting element LD may be connected to the second electrode of the sixteenth transistor T16, and a cathode of the light emitting element LD may be connected to the second power line PL2. The light emitting element LD may be a light emitting diode. The light emitting element LD may be an organic light emitting diode, an inorganic light emitting diode, a quantum dot/well light emitting diode, or the like. The light emitting element LD may emit any one color among a first color, a second color, and a third color. In addition, in this embodiment, only one light emitting element LD is provided in the pixel PXij. However, in another embodiment, a plurality of light emitting elements may be provided in a pixel. The plurality of light emitting elements may be connected in series, parallel, series/parallel, or the like.

A voltage of the first driving power source VDD may be applied to the first power line PL1, a voltage of the second driving power source VSS may be applied to the second power line PL2, and a voltage of the initialization power source VINT may be applied to the third power line PL3. For example, the voltage of the initialization power source VINT may be equal to or higher than the voltage of the second driving power source VSS. For example, the voltage of the initialization power source VINT may be set to be equal to or lower than the smallest magnitude of the data voltage among the range of voltages that can be supplied for a data signal.

Figure 13:
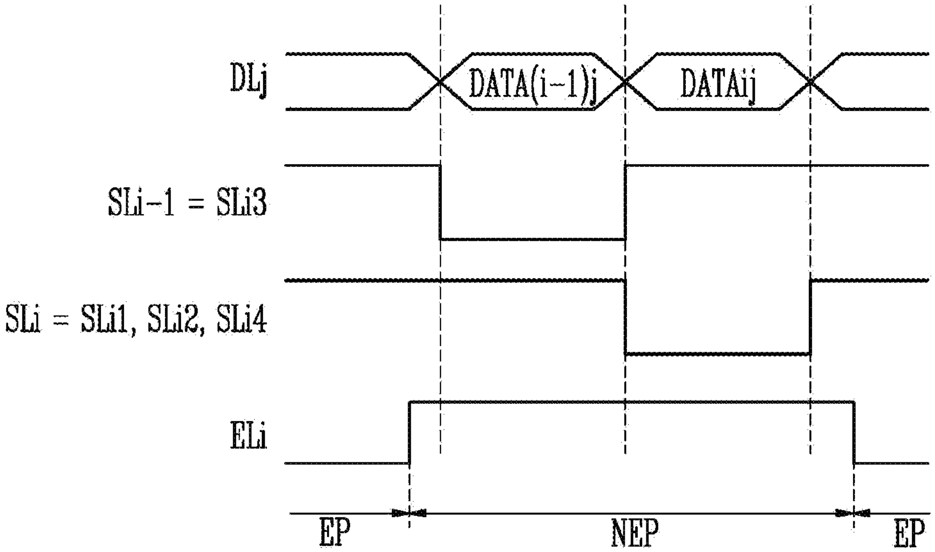
FIG. 13 is a diagram illustrating an example method of driving the pixel shown in FIG. 12.

FIG. 13 is a diagram illustrating an example method of driving the pixel shown in FIG. 12.

Hereinafter, for convenience of description, it is assumed that the scan lines SLi1, SLi2, and SLi4 correspond to an ith scan line SLi, and the scan line SLi3 corresponds to an (i−1)th scan line SLi−1. However, in some embodiments, a connection relationship between the scan lines SLi1, SLi2, SLi3, and SLi4 may differ. For example, the scan line SLi4 may be an (i−1)th scan line or an (i+1)th scan line.

First, an emission control signal having a turn-off level (e.g., logic high level) is applied to the ith emission control line ELi, a data signal DATA (i−1) j for an (i−1)th pixel is applied to the data line DLj, and a scan signal having a turn-on level (e.g., logic low level) is applied to the scan line SLi3. High/low of a logic level may be changed according to whether a transistor is a P-type or an N-type.

Since a scan signal having the turn-off level is applied to the scan lines SLi1 and SLi2, the twelfth transistor T12 is in a turn-off state, and the data signal DATA(i−1)j for the (i−1)th pixel is prevented from being input to the pixel PXij.

Since the fourteenth transistor T14 is in a turn-on state, the first node N1 is connected to the third power line PL3, and is initialized to the voltage of the initialization power source VINT. Since the emission control signal having the turn-off level is applied to the emission control line ELi, the transistors T15 and T16 are in the turn-off state. This way, when applying the voltage from the initialization power source, unnecessary light emission from the light emitting element LD is prevented.

Next, a data signal DATAij for an ith pixel PXij is applied to the data line DLj, and the scan signal having the turn-on level is applied to the scan lines SLi1 and SLi2. Accordingly, the transistors T12, T11, and T13 are in a conduction state, and the data line DLj and the first node N1 are electrically connected to each other. Therefore, a compensation voltage obtained by subtracting a threshold voltage of the eleventh transistor T11 from the data signal DATAij is applied to the second electrode of the storage capacitor Cst (e.g., the first node N1). Consequently, the storage capacitor Cst maintains a voltage corresponding to the difference between the voltage of the first driving power source VDD and the compensation voltage. This period may be referred to as a threshold voltage compensation period or a data writing period.

In addition, when the scan line SLi4 is the ith scan line, the seventeenth transistor T17 is in the turn-on state. Hence, the anode of the light emitting element LD and the third power line PL3 are connected to each other. Therefore, the light emitting element LD is initialized to a charge amount that corresponds to the voltage difference between the voltage of the initialization power source VINT and the second driving power source VSS.

After that, as the emission control signal having the turn-on level is applied to the ith emission control line ELi, the transistors T15 and T16 may be electrically connected to each other. Therefore, a driving current path is formed, through which the first power line PL1, the fifteenth transistor T15, the eleventh transistor T11, the sixteenth transistor T16, the light emitting element LD, and the second power line PL2 are connected to each other.

An amount of driving current flowing through the first electrode and the second electrode of the eleventh transistor T11 is adjusted according to the voltage maintained in the storage capacitor Cst. The light emitting element LD emits light with a luminance corresponding to the amount of driving current. The light emitting element LD emits light until before the emission control signal having the turn-off level is applied to the emission control line ELi.

When an emission control signal has the turn-on level, pixels receiving the corresponding emission control signal may be in a display state. The period in which the emission control signal has the turn-on level may be referred to as an emission period EP (or an emission allow period). In addition, when the emission control signal has the turn-off level, pixels receiving the corresponding emission control signal may be in a non-display state. The period in which the emission control signal has the turn-off level may be referred to as a non-emission period NEP (or an emission inhibit period).

The non-emission period NEP described in FIG. 12 is used to prevent the pixel PXij from emitting light with an unwanted luminance while passing through the initialization period and the data write period.

One or more non-emission periods NEP may be additionally provided while a data signal written to the pixel PXij is maintained (e.g., one frame period). This approached is aimed at reducing the emission period EP of the pixel PXij. As a result, it enables the effective depiction of a low grayscale or a subtle blurring of motion in an image.

In the display device and the method of driving the same in accordance with the present disclosure, a gamma value is set by considering a load of data lines, a shape of the pixel unit, a process variation, and the like, so that display quality can be improved.

Example embodiments have been disclosed herein, and although specific terms are employed, they are used and are to be interpreted in a generic and descriptive sense and not for purpose of limitation. In some instances, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and detail may be made thereto without departing from the spirit and scope of the present disclosure as set forth in the following claims.

What is claimed is:

1. A display device comprising:

a pixel unit partitioned into a plurality of blocks each including at least one scan line, the pixel unit including pixels connected to the at least one scan line and a data line in each of the plurality of blocks;

a gamma voltage supplier configured to generate a gamma voltage, based on a gamma value;

a data driver configured to generate a data signal to be supplied to the data line, using the gamma voltage; and a timing controller configured to supply different gamma values for at least two blocks among the plurality of blocks, each of the different gamma values corresponding to the same grayscale and includes a first gamma value, a second gamma value and a third gamma value, wherein:

one of the different gamma values is applied to generate gamma voltages for a first of the at least two blocks, and another of the different gamma values is applied to generate gamma voltages for a second of the at least two blocks.

2. The display device of claim 1, wherein the gamma voltage supplier generates different gamma voltages, which correspond to the same grayscale, based on the different gamma values.

3. The display device of claim 2, wherein the data driver generates data signals having different voltages, which are to be supplied to the at least two blocks, each of the data signals corresponding to the same grayscale.

4. The display device of claim 1, wherein the timing controller supplies the different gamma values to the at least two blocks to compensate for a load of the data line.

5. The display device of claim 1, wherein the plurality of blocks include an odd-numbered block including an odd-numbered scan line and an even-numbered block including an even-numbered scan line.

6. The display device of claim 5, wherein the timing controller supplies an odd gamma value, corresponding to the odd-numbered block, and supplies an even gamma value different from the odd gamma value, corresponding to the even-numbered block.

7. The display device of claim 6, wherein the pixel unit includes a plurality of areas including at least one odd-numbered block and at least one even-numbered block.

8. The display device of claim 7, wherein the timing controller supplies different even gamma values and different odd gamma values to their respective areas.

9. The display device of claim 1, wherein the pixel unit has widths that are at least partially different, and areas of the at least two blocks among the plurality of blocks are different.

10. The display device of claim 9, wherein the timing controller supplies the different gamma values to the at least two blocks with the different areas.

11. The display device of claim 1, wherein the timing controller includes:

a look-up table configured to store the gamma value; and a gamma value supplier configured to supply, to the gamma voltage supplier, the gamma value corresponding to a position of a block to which the data signal is supplied.

12. The display device of claim 11, wherein the gamma value supplier determines the position of the block to which the data signal is supplied, using at least one of a data enable signal and a horizontal synchronization signal.

13. The display device of claim 11, wherein, when the gamma value corresponding to a first portion of the plurality of blocks is stored in the look-up table, the gamma value supplier generates the gamma value corresponding to a second portions of the plurality of blocks through interpolation.

14. A method of driving a display device, the method comprising:

generating first block gamma voltages, based on a first block gamma value;

generating a first data signal, corresponding to the first block gamma voltages, wherein the first block gamma voltages include a first gamma voltage corresponding to a first color, a second gamma voltage corresponding to a second color, and a third gamma voltage corresponding to a third color;

supplying the first data signal to first pixels included in a first block;

generating second block gamma voltages, based on a second block gamma value different from the first block gamma value;

generating a second data signal, corresponding to the second block gamma voltages, wherein the second block gamma voltages include a first gamma voltage corresponding to the first color, a second gamma voltage corresponding to the second color, and a third gamma voltage corresponding to the third color; and supplying the second data signal to second pixels included in a second block, wherein the first pixels are supplied with the first data signal having a first voltage, and the second pixels are supplied with the second data signal having a second voltage different from the first voltage, the first data signal and the second data signal corresponding to the same grayscale.

15. The method of claim 14, wherein each of the first block and the second block includes at least one scan line.

16. The method of claim 14, wherein the first block includes an odd-numbered scan line, and the second block includes an even-numbered scan line.

17. The method of claim 14, wherein an area of the first block and an area of the second block are different from each other.

18. The method of claim 14, wherein the first block gamma value and the second block gamma value are set such that light with the same luminance is generated in the first pixels and the second pixels.

19. The method of claim 14, further comprising:

determining whether the first data signal or the second data signal has been supplied, using at least one of a data enable signal and a horizontal synchronization signal, and storing the first block gamma value and the second block gamma value in a look-up table.

20. An electronic device comprising:

a display device including:

a pixel unit partitioned into a plurality of blocks each including at least one scan line, the pixel unit including pixels connected to the at least one scan line and a data line in each of the plurality of blocks;

a gamma voltage supplier configured to generate a gamma voltage, based on a gamma value;

a data driver configured to generate a data signal to be supplied to the data line, using the gamma voltage; and a timing controller configured to supply different gamma values for at least two blocks among the plurality of blocks, each of the different gamma values corresponding to the same grayscale and includes a first gamma value, a second gamma value and a third gamma value, wherein:

one of the different gamma values is applied to generate gamma voltages for a first of the at least two blocks, and another of the different gamma values is applied to generate gamma voltages for a second of the at least two blocks.

* * * * *